US009097553B2

(12) United States Patent
Kurtti et al.

(10) Patent No.: US 9,097,553 B2
(45) Date of Patent: Aug. 4, 2015

(54) NAVIGATION BASED ON DIRECTION OF TRAVEL/USER-DEFINED PATH

(75) Inventors: Jeffery Wayne Kurtti, Prosper, TX (US); Donald H. Relyea, Jr., Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 486 days.

(21) Appl. No.: 12/426,592

(22) Filed: Apr. 20, 2009

(65) Prior Publication Data

US 2010/0268463 A1  Oct. 21, 2010

(51) Int. Cl.
*G01C 21/00* (2006.01)
*G01C 21/36* (2006.01)

(52) U.S. Cl.
CPC .................................. *G01C 21/3679* (2013.01)

(58) Field of Classification Search
CPC .. G01C 21/3682; G01C 21/00; G01C 21/362; G01C 21/20; G01C 21/26; G01C 21/32; G01C 21/34; G01C 21/3476; G01C 21/3617; G01C 3/18; G01C 21/3679; G06F 17/3087; G06F 17/30241; G08G 1/096838; G08G 1/096827; G08G 1/096872; G08G 1/096894; G08G 1/0969; G08G 1/096716; G08G 1/09675; G08G 1/09783; G08G 1/0962; G09B 29/106; G01S 17/46; G01S 19/41
See application file for complete search history.

(56) References Cited

U.S. PATENT DOCUMENTS

| | | | | |
|---|---|---|---|---|
| 6,321,158 | B1 * | 11/2001 | DeLorme et al. | 701/426 |
| 7,155,339 | B2 * | 12/2006 | Tu | 701/426 |
| 7,522,995 | B2 * | 4/2009 | Nortrup | 701/425 |
| 2003/0004743 | A1 * | 1/2003 | Callegari | 705/1 |
| 2007/0219706 | A1 * | 9/2007 | Sheynblat | 701/200 |

FOREIGN PATENT DOCUMENTS

WO    WO 01/65426 A1    9/2001

OTHER PUBLICATIONS

GPSmagazine.com, LLC, "Comments for Magellan Maestro 4250 Review," www.gpsmaaazine.com/comments/000395.php, Dec. 20, 2007, 19 pages.
Magellan Navigation, Inc., "Magellan® Maestro™ 3200—User Manual," http://support.magellangps.com/support/assets/manuals/maestro_3200_manual_en.pdf, Apr. 18, 2007, 60 pages.

\* cited by examiner

*Primary Examiner* — Luke Gilligan
*Assistant Examiner* — Kristine Rapillo

(57) ABSTRACT

A device receives global navigation satellite system coordinates associated with a mobile user device, and determines a direction of travel of the mobile user device based on the global navigation satellite system coordinates. The device creates a user-defined path based on a user-defined starting point, a user-defined destination point, and one or more user-defined intermediate points received from the mobile user device, and receives, from the mobile user device, a search request for points of interest in one of the direction of travel or along the user-defined path. The device further determines, based on the search request, one or more points of interest in the direction of travel or along the user-defined path, and provides, to the mobile user device, the determined one or more points of interest in the direction of travel or along the user-defined path.

25 Claims, 16 Drawing Sheets

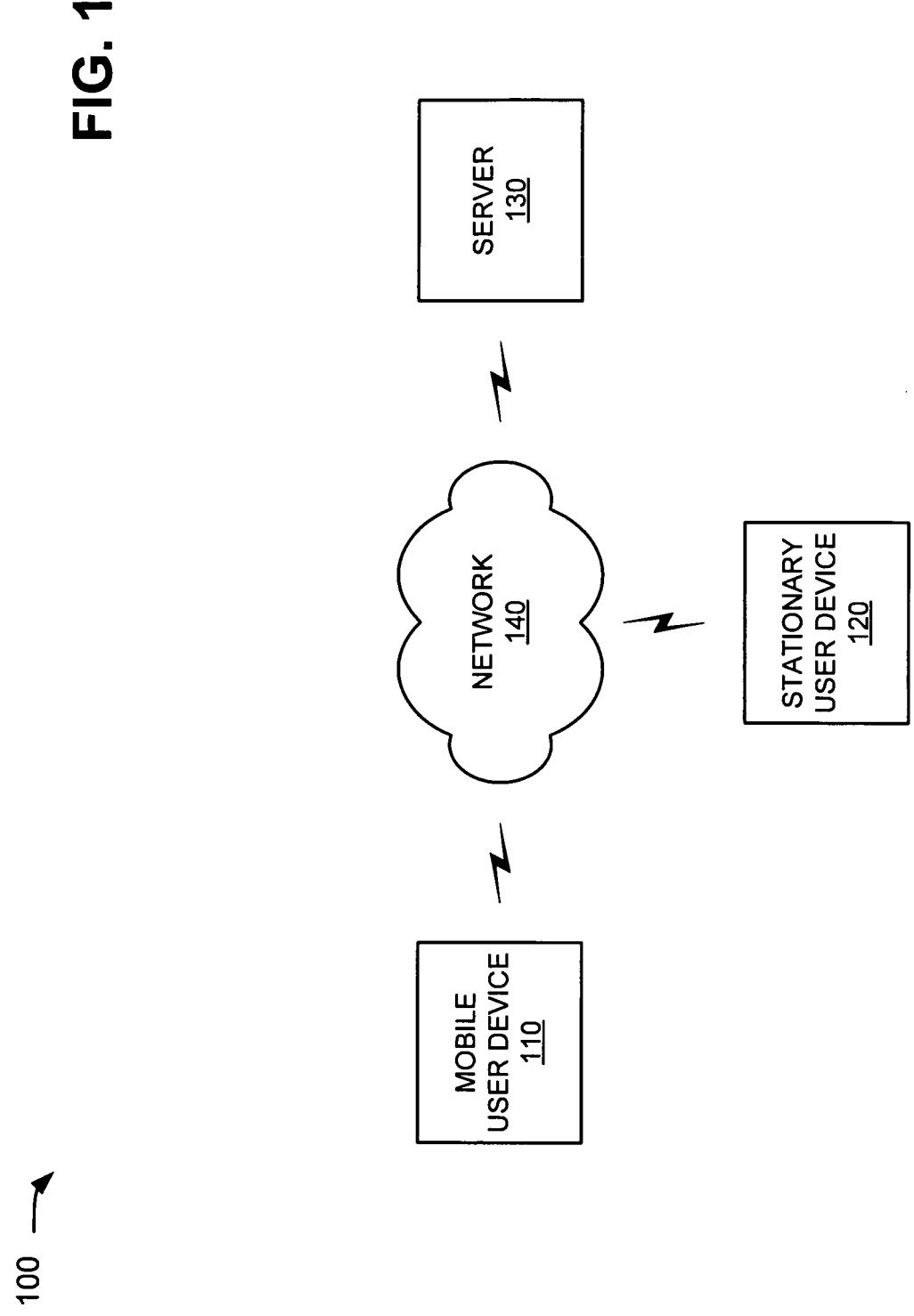

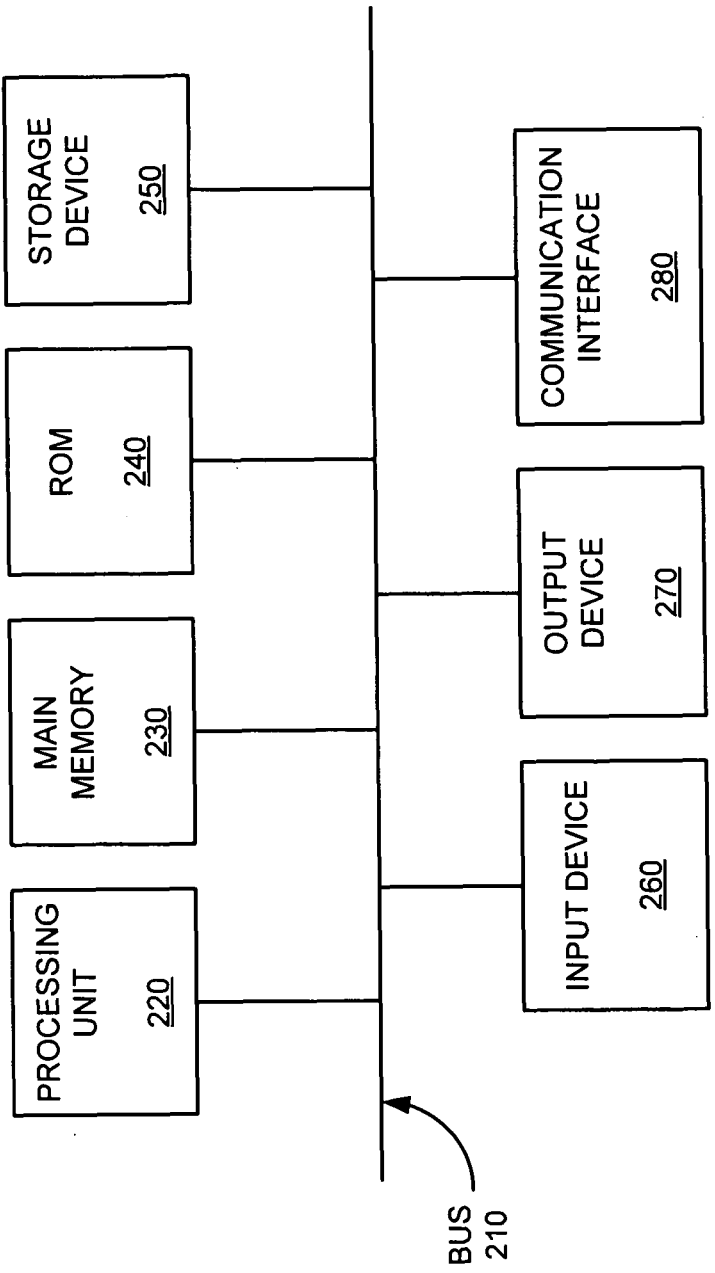

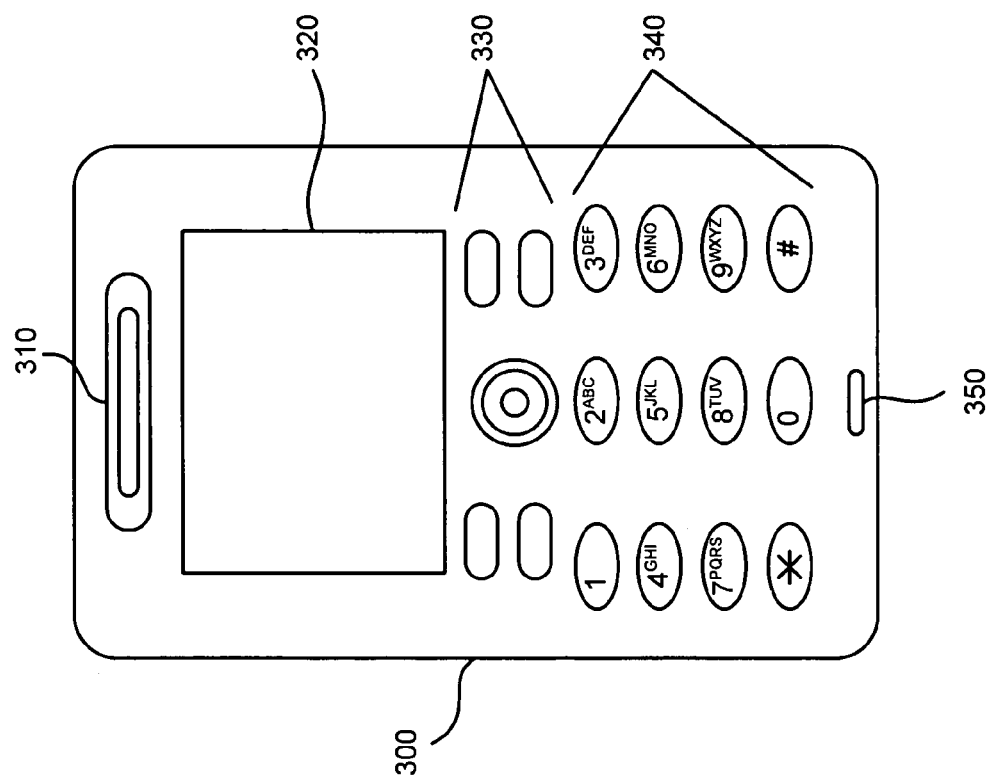

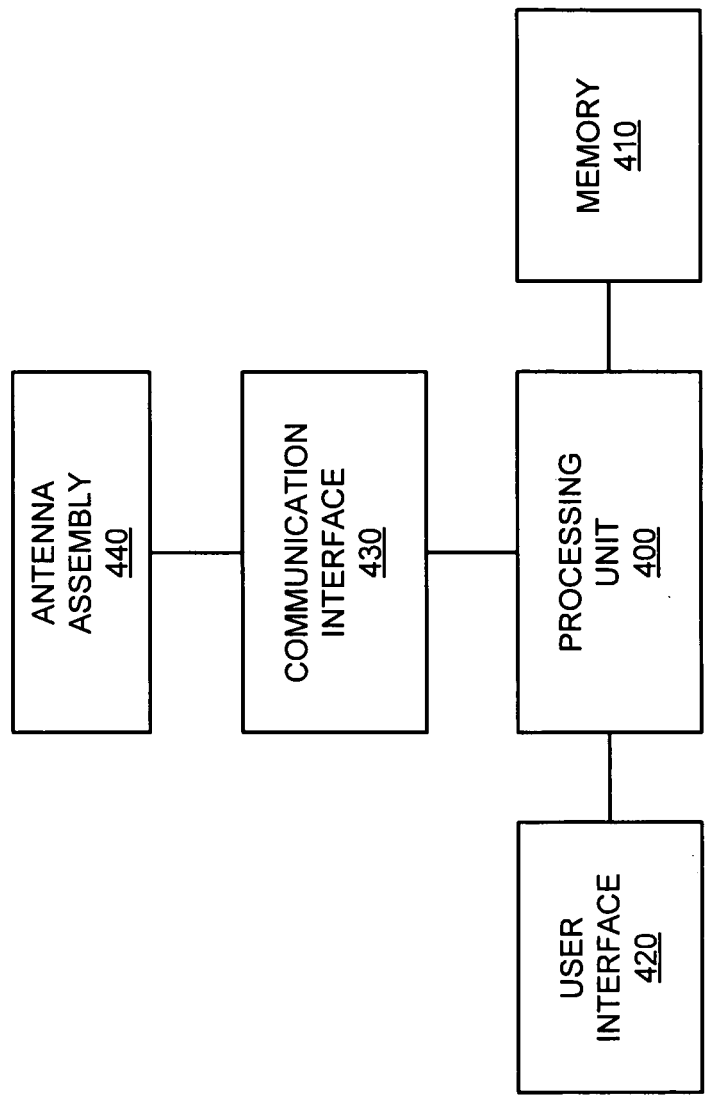

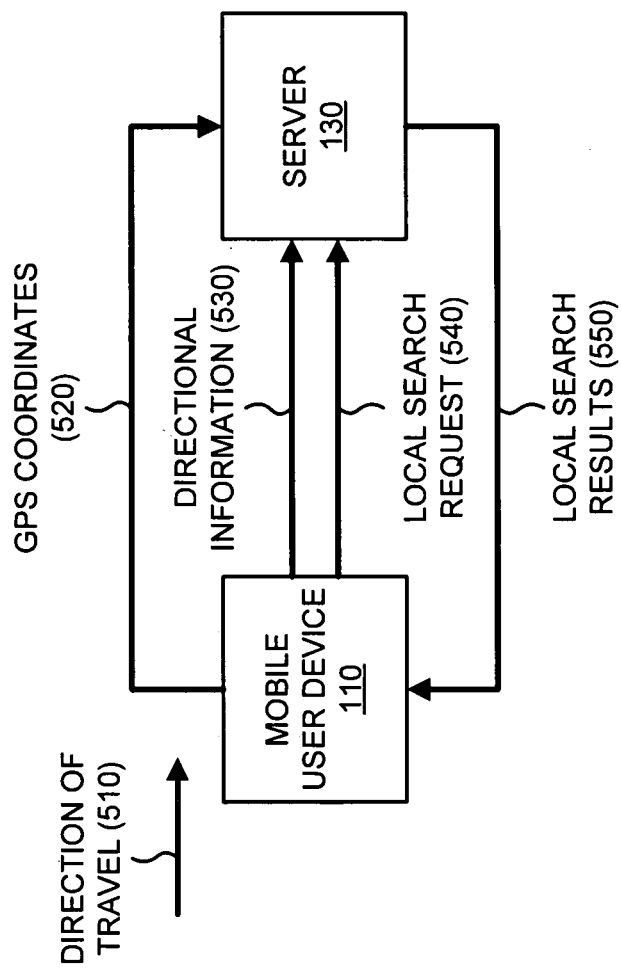

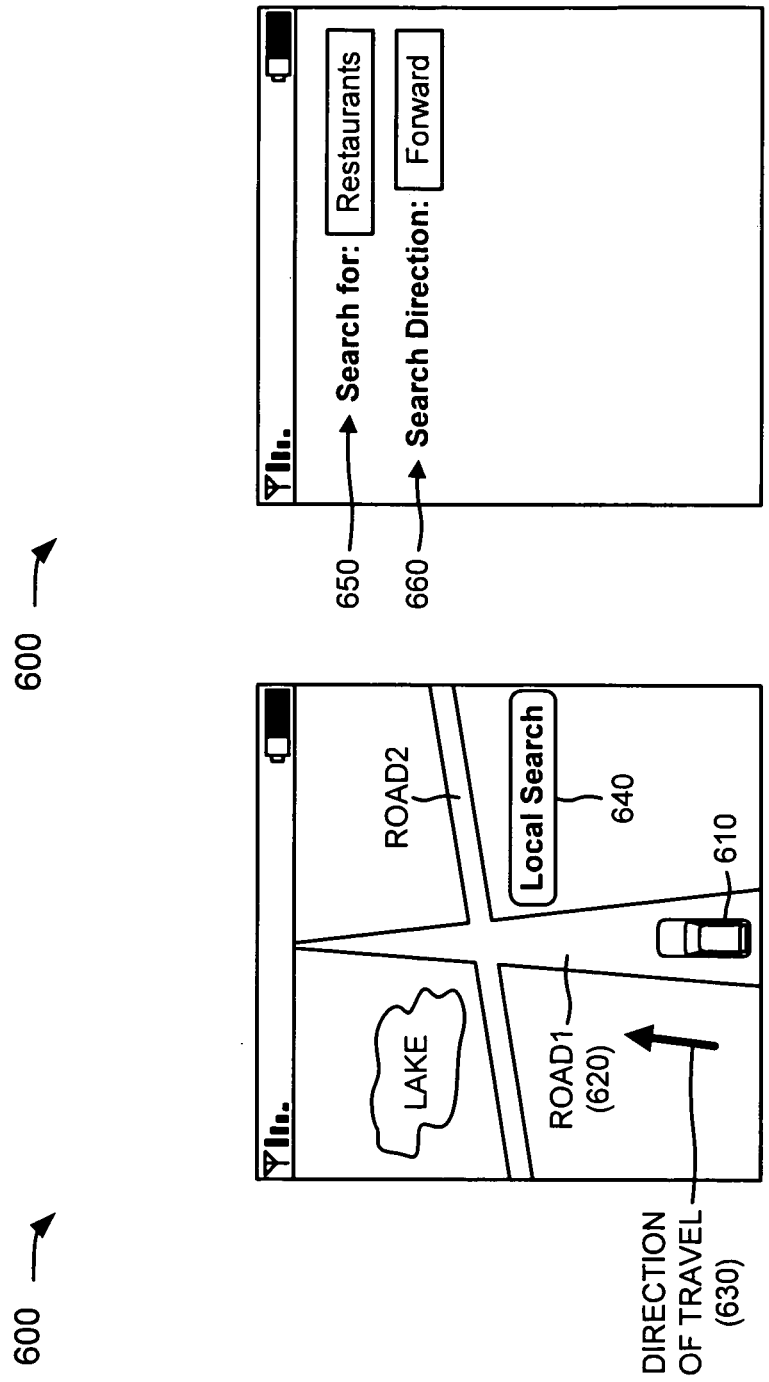

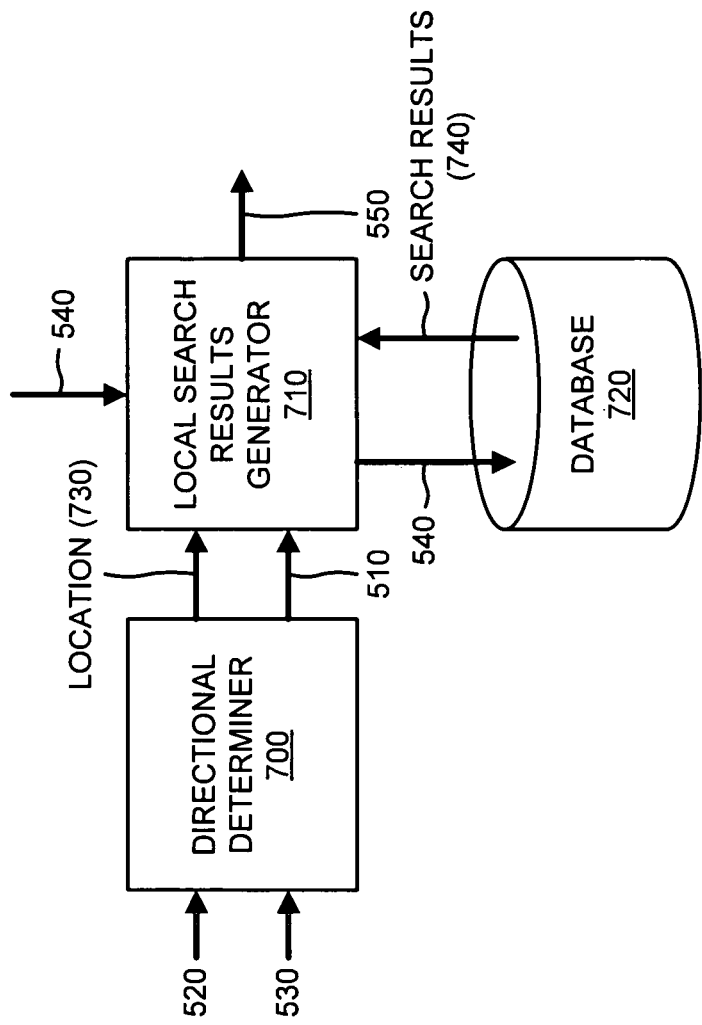

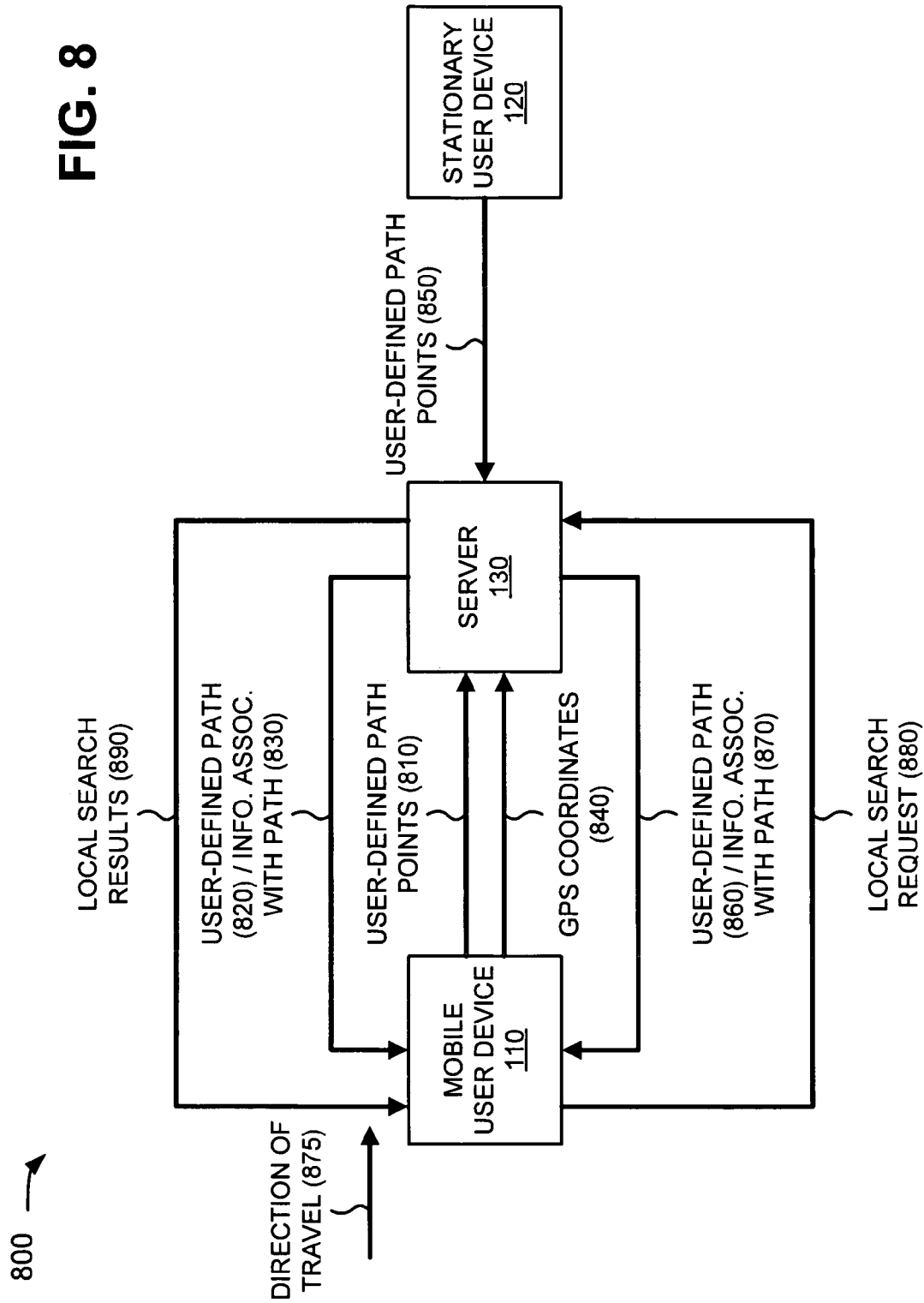

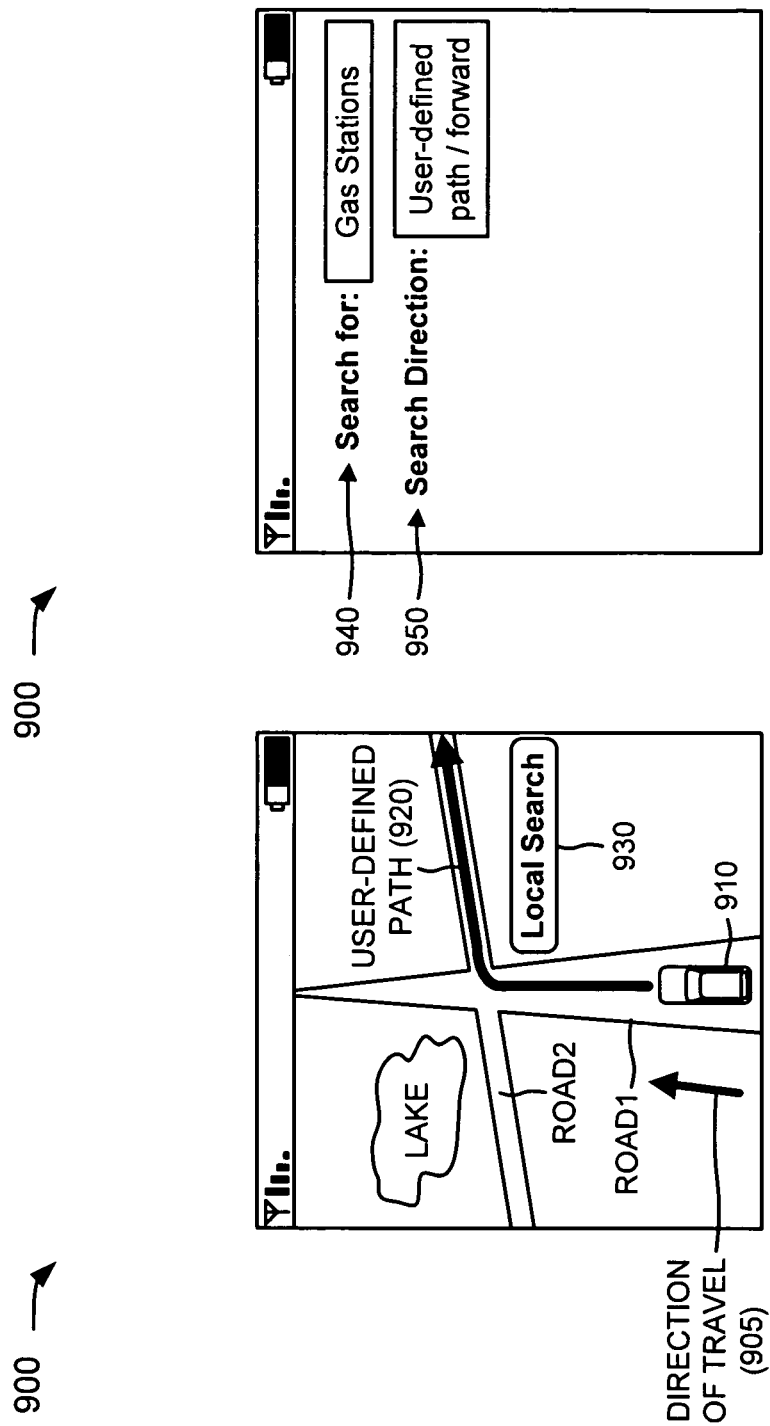

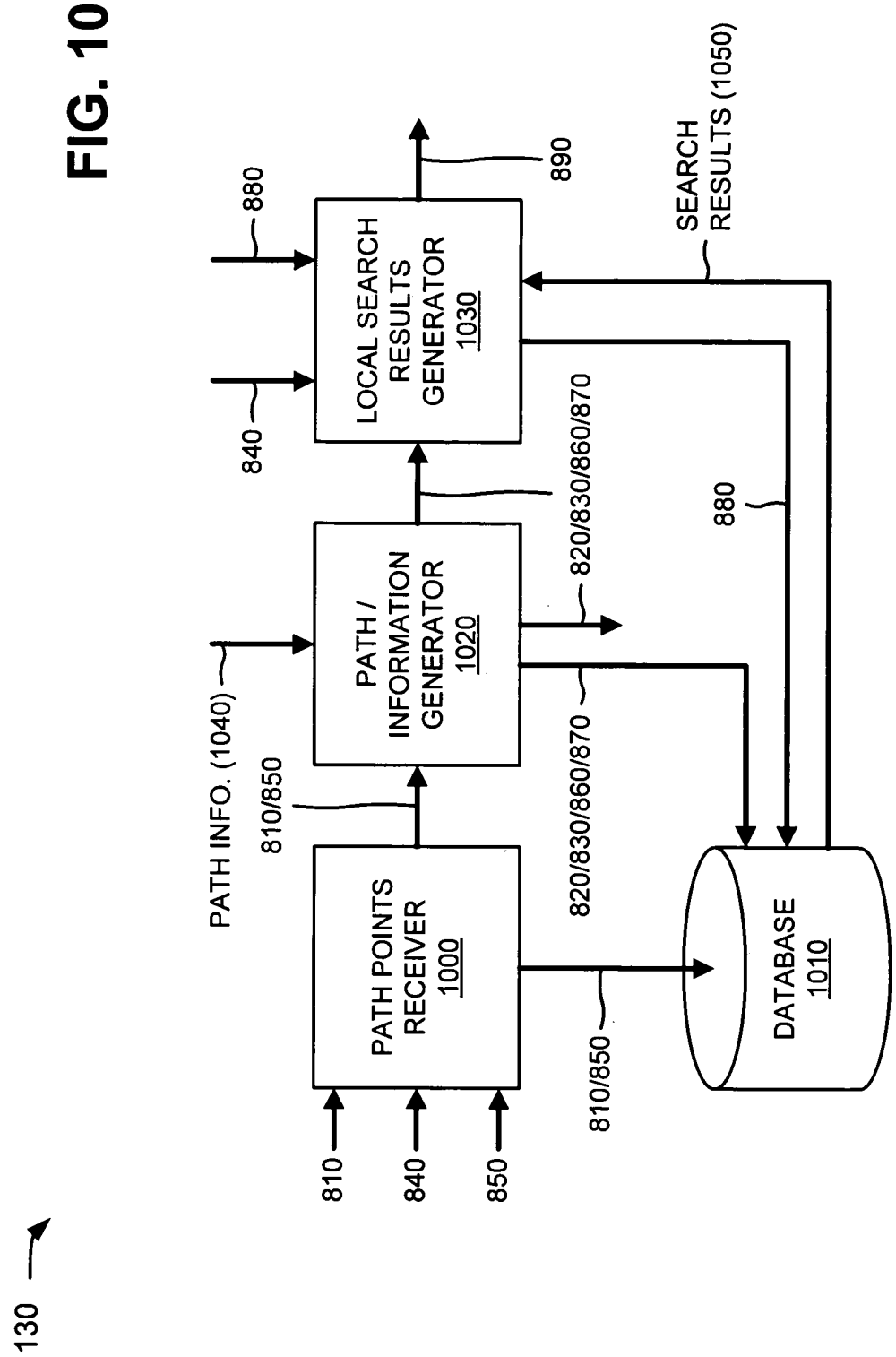

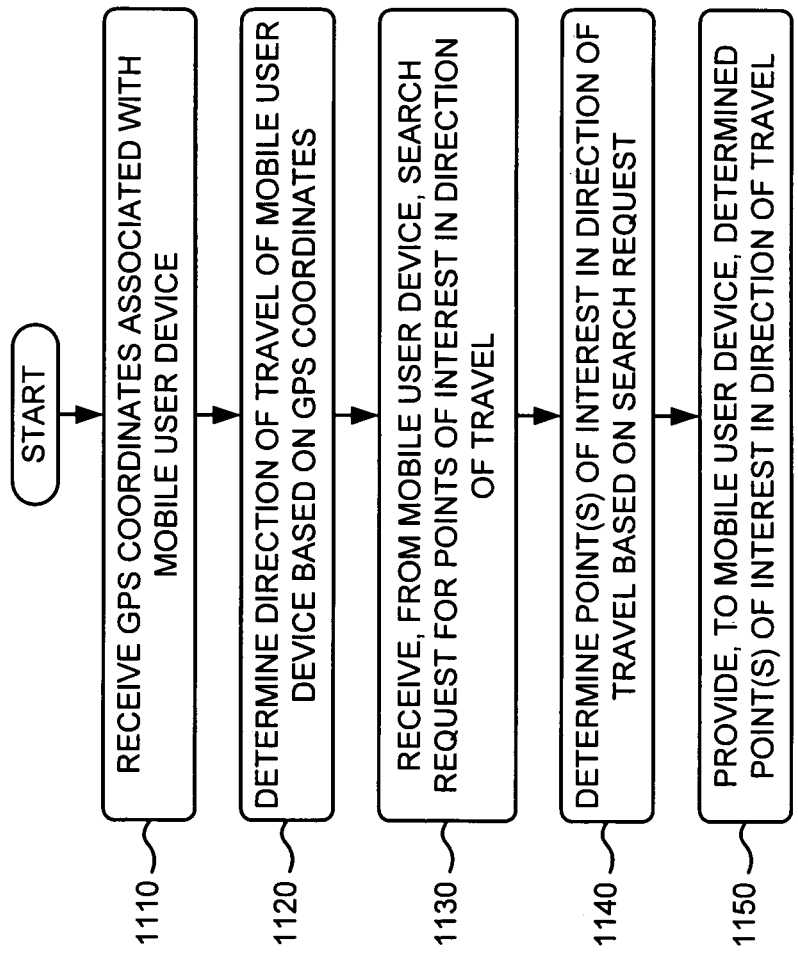

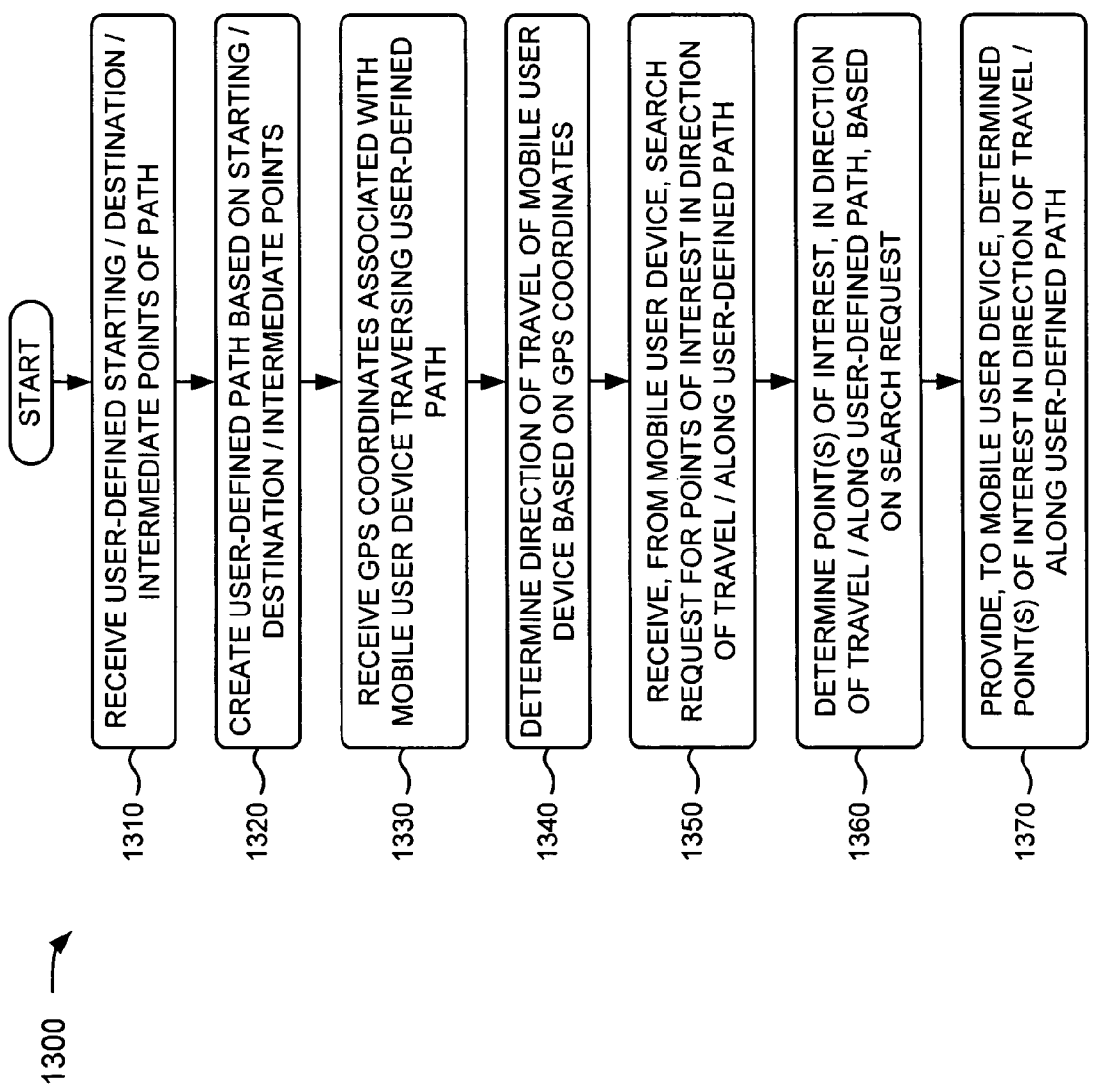

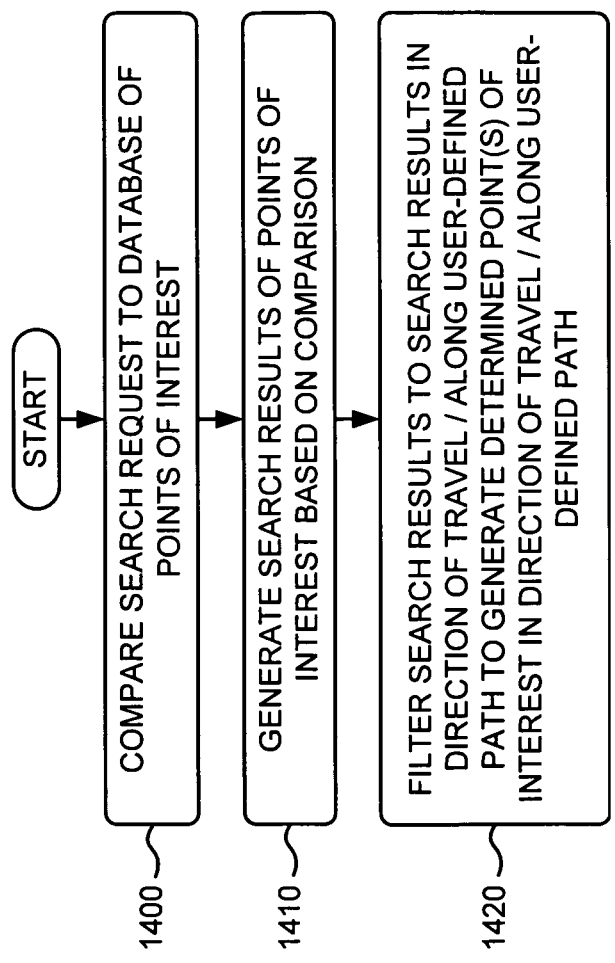

NAVIGATION BASED ON DIRECTION OF TRAVEL/USER-DEFINED PATH

BACKGROUND

A mobile communication device (e.g., a cell phone, a personal digital assistant (PDA), a global positioning system (GPS) navigation device, etc) may display a map showing the location of a user of the mobile communication device in order to aid the user with navigation (e.g., when walking or driving around an unknown location). Many navigation applications enable the mobile communication device user to input information, such as a starting point, a destination point, how a path between the starting and destination points should be calculated (e.g., shortest distance, shortest time, most use of highways, etc.), etc. The navigation applications utilize this information to calculate a path for the mobile communication device user.

The navigation applications also enable the mobile communication device user to perform a local search for points of interest (e.g., stores, restaurants, gas stations, etc.). The local search is performed in a radial pattern with a current location of the mobile communication device as the center point. The search results provided based on the local search may be ahead of, to the left of, to the right of, or behind the mobile communication device's current location. However, such navigation applications do not permit the mobile communication device to limit the local search results to points of interest in the direction of travel (e.g., the forward direction) of the mobile communication device.

BRIEF DESCRIPTION OF THE DRAWINGS

FIG. 1 depicts a diagram of an exemplary network in which systems and/or methods described herein may be implemented;

FIG. 2 illustrates a diagram of exemplary components of a stationary user device and/or a server of the network depicted in FIG. 1;

FIG. 3 depicts a diagram of an exemplary mobile user device of the network illustrated in FIG. 1;

FIG. 4 illustrates a diagram of exemplary components of the mobile user device depicted in FIG. 3;

FIG. 5 depicts a diagram of exemplary operations capable of being performed by an exemplary portion of the network illustrated in FIG. 1;

FIGS. 6A-6D illustrate diagrams of exemplary user interfaces capable of being generated by the mobile user device and/or the server depicted in FIG. 1;

FIG. 7 depicts a diagram of exemplary functional components of the server illustrated in FIG. 1;

FIG. 8 illustrates a diagram of additional exemplary operations capable of being performed by an exemplary portion of the network depicted in FIG. 1;

FIGS. 9A-9D depict diagrams of further exemplary user interfaces capable of being generated by the mobile user device and/or the server illustrated in FIG. 1;

FIG. 10 illustrates a diagram of additional exemplary functional components of the server illustrated in FIG. 1;

FIGS. 11 and 12 depict flow charts of an exemplary process for determining points of interest in a direction of travel of a mobile user device according to implementations described herein; and FIGS. 13 and 14 illustrate flow charts of an exemplary process for determining points of interest, in a direction of travel and along a user-defined path, of a mobile user device according to implementations described herein.

DETAILED DESCRIPTION OF PREFERRED EMBODIMENTS

Figures 6C, 6D:
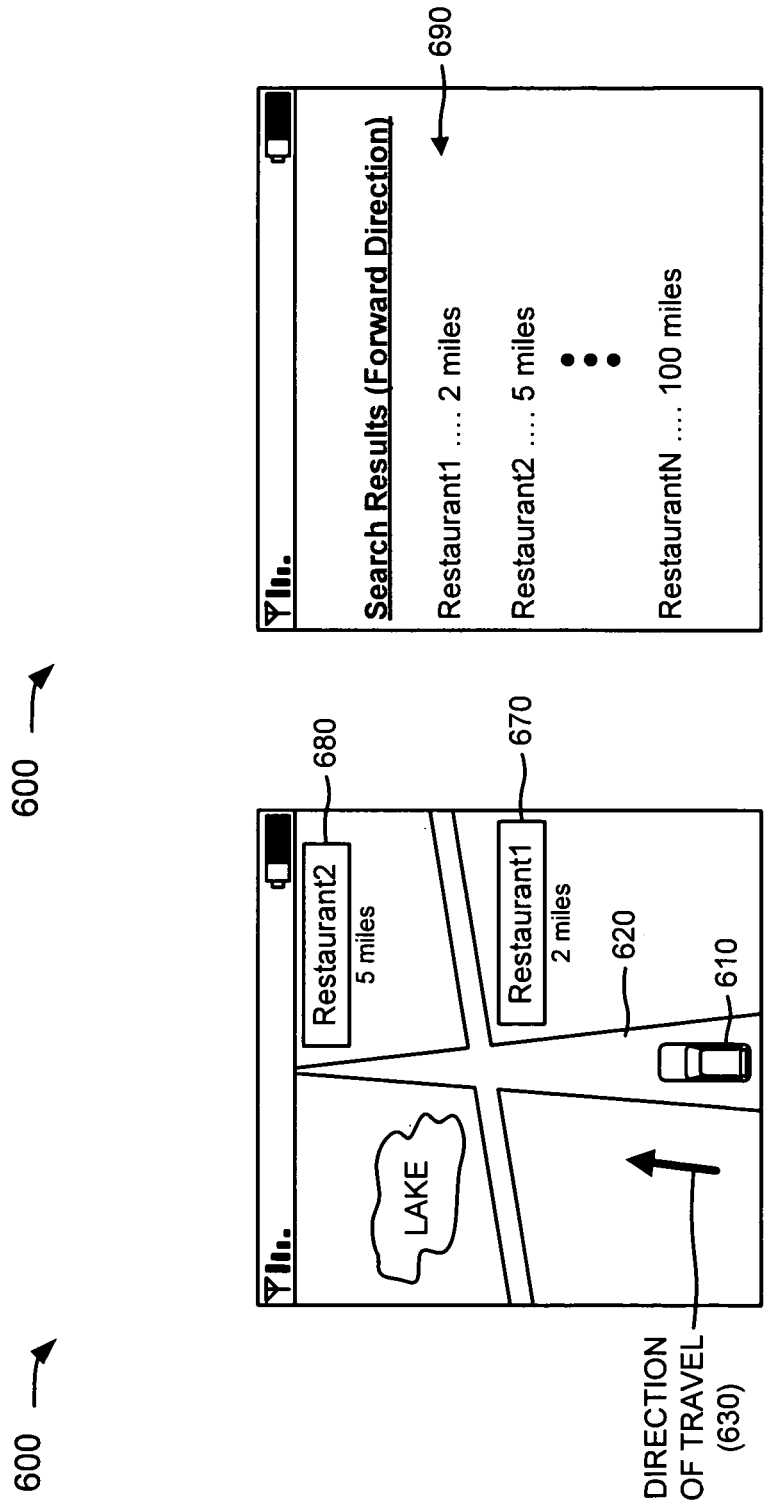

The following detailed description refers to the accompanying drawings. The same reference numbers in different drawings may identify the same or similar elements. Also, the following detailed description does not limit the invention.

Systems and/or methods described herein may enable a user to filter points of interest search results provided by a navigation application associated with a mobile user device (e.g., a cell phone, a PDA, a GPS navigation device, etc.) to points of interest in a direction of travel of the mobile user device and/or along a user-defined path. In one implementation, for example, the systems and/or methods may receive GPS (or global navigation satellite system) coordinates associated with a mobile user device, and may determine a direction of travel of the mobile user device based on the GPS coordinates. The systems and/or methods may receive, from the mobile user device, a search request for points of interest in the direction of travel, and may determine, based on the search request, one or more points of interest in the direction of travel. The systems and/or methods may provide, to the mobile user device, the determined one or more points of interest in the direction of travel.

As used herein, the term "user" is intended to be broadly interpreted to include a user device or a user of a user device. A "path," as the term is used herein, is to be broadly interpreted to include a course between two points, a route between two points, etc. Furthermore, the term "user device," as used herein, is intended to be broadly interpreted to include a mobile user device or a stationary user device.

FIG. 1 is a diagram of an exemplary network 100 in which systems and/or methods described herein may be implemented. As illustrated, network 100 may include a mobile user device 110, a stationary user device 120, and a server 130 interconnected by a network 140. Components of network 100 may interconnect via wired and/or wireless connections. A single mobile user device 110, stationary user device 120, server 130, and network 140 have been illustrated in FIG. 1 for simplicity. In practice, there may be more mobile user devices 110, stationary user devices 120, servers 130, and/or networks 140. Also, in some instances, one or more of the components of network 100 may perform one or more functions described as being performed by another one or more of the components of network 100.

Mobile user device 110 may include any device (e.g., a mobile communication device) that is capable of accessing server 130 via network 140. For example, mobile user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a GPS navigation device, an in-vehicle GPS navigation system, an in-vehicle global navigation satellite system, or other types of computation or communication devices, threads or processes running on these devices, and/or objects executable by these devices. In one implementation, mobile user device 110 may enable a user to filter points of interest search results, provided by a navigation application associated with mobile user device 110, to points of interest in a direction of travel of mobile user device 110 and/or along a user-defined path.

Stationary user device 120 may include any device that is capable of accessing server 130 via network 140. For example, stationary user device 120 may include a laptop computer, a personal computer, a set-top box (STB), a television, or other types of computation or communication devices, threads or processes running on these devices, and/or objects executable by these devices. In one implementation, stationary user device 120 may enable a user to customize a calculated path provided by a navigation application associated with mobile user device 110. The user, via stationary user device 120, may customize the calculated path by inputting intermediate points (e.g., locations to travel past that may be between a starting point and a destination point) and/or additional path information (e.g., utilize certain streets, highways, etc. between the starting and destination points).

Server 130 may include one or more server entities, or other types of computation or communication devices, that gather, process, search, and/or provide information in a manner described herein. In one implementation, server 130 may receive (e.g., from mobile user device 110) GPS (or global navigation satellite system) coordinates associated with mobile user device 110, and may determine a direction of travel of mobile user device 110 based on the GPS coordinates. Server 130 may receive, from mobile user device 110, a search request for points of interest in the direction of travel, and may determine, based on the search request, one or more points of interest in the direction of travel. Server 130 may provide, to mobile user device 110, the determined one or more points of interest in the direction of travel of mobile user device 110.

Network 140 may include a local area network (LAN), a wide area network (WAN), a metropolitan area network (MAN), a telephone network, such as the Public Switched Telephone Network (PSTN) or Public Land Mobile Network (PLMN), an intranet, the Internet, or a combination of networks.

FIG. 2 illustrates a diagram of exemplary components of a device 200 that may correspond to stationary user device 120 and/or server 130. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 140.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

FIG. 3 depicts a diagram of an exemplary mobile user device 110. As illustrated, mobile user device 110 may include a housing 300, a speaker 310, a display 320, control buttons 330, a keypad 340, and/or a microphone 350. Housing 300 may protect the components of mobile user device 110 from outside elements. Speaker 310 may provide audible information to a user of mobile user device 110.

Display 320 may provide visual information to the user. For example, display 320 may display text input into mobile user device 110, text, images, video, and/or graphics received from another device, and/or information regarding incoming or outgoing calls or text messages, emails, media, games, phone books, address books, the current time, navigation directions, etc. Control buttons 330 may permit the user to interact with mobile user device 110 to cause mobile user device 110 to perform one or more operations. For example, control buttons 330 may be used to cause mobile user device 110 to transmit information. Keypad 340 may include a standard telephone keypad. Microphone 350 may receive audible information from the user.

Although FIG. 3 shows exemplary components of mobile user device 110, in other implementations, mobile user device 110 may contain fewer, different, differently arranged, or additional components than depicted in FIG. 3. In still other implementations, one or more components of mobile user device 110 may perform one or more other tasks described as being performed by one or more other components of mobile user device 110.

FIG. 4 illustrates a diagram of exemplary components of mobile user device 110. As shown, mobile user device 110 may include a processing unit 400, memory 410, a user interface 420, a communication interface 430, and/or an antenna assembly 440.

Processing unit 400 may include one or more processors, microprocessors, application specific integrated circuits (ASICs), field programmable gate arrays (FPGAs), or the like. Processing unit 400 may control operation of mobile user device 110 and its components. In one implementation, processing unit 400 may control operation of components of mobile user device 110 in a manner described herein.

Memory 410 may include a random access memory (RAM), a read-only memory (ROM), and/or another type of memory to store data and instructions that may be used by processing unit 400.

User interface 420 may include mechanisms for inputting information to mobile user device 110 and/or for outputting information from mobile user device 110. Examples of input and output mechanisms might include buttons (e.g., control buttons 330, keys of keypad 340, a joystick, etc.) or a touch screen interface to permit data and control commands to be input into mobile user device 110; a speaker (e.g., speaker 310) to receive electrical signals and output audio signals; a microphone (e.g., microphone 350) to receive audio signals and output electrical signals; a display (e.g., display 320) to output visual information (e.g., text input into mobile user device 110); and/or a vibrator to cause mobile user device 110 to vibrate.

Communication interface 430 may include, for example, a transmitter that may convert baseband signals from processing unit 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network (e.g., network 140).

As will be described in detail below, mobile user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows exemplary components of mobile user device 110, in other implementations, mobile user device 110 may contain fewer, different, differently arranged, or additional components than depicted in FIG. 4. In still other implementations, one or more components of mobile user device 110 may perform one or more other tasks described as being performed by one or more other components of mobile user device 110.

FIG. 5 depicts a diagram of exemplary operations capable of being performed by an exemplary portion 500 of network 100. As illustrated, exemplary network portion 500 may include mobile user device 110 and server 130. Mobile user device 110 and server 130 may include the features described above in connection with, for example, FIG. 1.

A user associated with mobile user device 110 may access a GPS navigation application (e.g., software that provides navigation with route calculation and directions to the user of the route to take, based on a vector-based map; software that provides navigation tracking and shows where you have been; Nav N Go; TomTom Navigator; TomTom Mobile; DeLorme Street Atlas; ALK CoPilot Live Laptop; Destinator; Garmin nRoute; Microsoft Streets and Trips; Google Earth; Google Maps; VZ Navigator; etc.) associated with mobile user device 110. Mobile user device 110 may be moving in a direction of travel 510 (e.g., mobile user device 110 may be traveling in a vehicle), and may provide GPS (or global navigation satellite system) coordinates 520 and/or directional information 530, associated mobile user device 110, to server 130. Direction of travel 510 may include a direction (e.g., north, south, east, west, etc.) associated with the movement of mobile user device 110 (e.g., mobile user device 110 may be in a vehicle traveling northeast on northbound Interstate-95). GPS coordinates 520 may provide a location of mobile user device 110. For example, if mobile user device 110 is traveling by a corner of two streets, GPS coordinates 520 may provide the GPS coordinates associated with the corner of the two streets. Directional information 530 may include information associated with direction of travel 510 and may be determined based on GPS coordinates 520 associated with mobile user device 110 over time.

Server 130 may receive GPS coordinates 520 and/or directional information 530, and may determine direction of travel 510 based on GPS coordinates 520 and/or directional information 530. For example, in one implementation, server 130 may receive GPS coordinates 520 over time (e.g., mobile user device 110 may be located at point "A" at time "0" and may be located at point "B" one minute later), and may calculate direction of travel 510 based GPS coordinates 520 (e.g., direction of travel 510 may be a direction provided by connecting point "A" to point "B"). In another implementation, server 130 may receive directional information 530 (e.g., indicating that mobile user device 110 is traveling northeast), and may calculate direction of travel 510 (e.g., northeast) based on directional information 530.

As further shown in FIG. 5, the user, via mobile user device 110, may provide a local search request 540, for points of interest in direction of travel 510, to server 130. Local search request 540 may include a request for points of interest (e.g., restaurants, gas stations, stores, etc.) near a location of mobile user device 110 (e.g., within a certain distance, such as one-hundred miles, of mobile user device 110) and in direction of travel 510 of mobile user device 110. Server 130 may receive local search request 540 for points of interest in direction of travel 510, and may determine one or more points of interest in direction of travel 510 based on local search request 540. Server 130 may provide, to mobile user device 110, local search results 550 based on local search request 540. Local search results 550 may include the determined one or more points of interest in direction of travel 510 of mobile user device 110.

In one implementation, the determined one or more points of interest in direction of travel 510 may include one or more points of interest within a certain distance (e.g., a certain number of miles) from mobile user device 110 and/or within a certain distance (e.g., a certain number of miles) from direction of travel 510. For example, the user of mobile user device 110 may set the certain distances based on how closely the user desires the one or more points of interest to be from mobile user device 110 and/or direction of travel 510.

For example, if the user and mobile user device 110 are traveling along a highway in a northeast direction (e.g., direction of travel 510), the user (e.g., via mobile user device 110) may initiate a local search for restaurants and may have an option of requesting only search results in direction of travel 510. Server 130 may receive the local search for restaurants, may determine search results of all restaurants within a predetermined radius from mobile user device 110, and may filter the determined search results to restaurants located along direction of travel 510 of mobile user device 110. Server 130 may provide the restaurants, located along direction travel 510, for display to the user (e.g., via mobile user device 110).

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

FIGS. 6A-6D illustrate diagrams of exemplary user interfaces 600 capable of being generated by mobile user device 110 and/or server 130. The user interfaces depicted in FIGS. 6A-6D, and the user interfaces depicted and described below in connection with FIGS. 9A-9D (collectively referred to as "the user interfaces"), may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, television interfaces, etc.). The user interfaces may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., display 320).

If a user (e.g., associated with mobile user device 110) accesses the GPS navigation application, the user may be presented with the user interface depicted in FIG. 6A. As shown, the user may be presented with a two-dimensional or three-dimensional view associated with a current location of mobile user device 110. For example, if GPS coordinates 520 associated with mobile user device 110 indicate that mobile user device 110 is traveling in a vehicle on a certain road (e.g., "ROAD1"), user interface 600 may display an image 610 of a vehicle traveling on an image 620 of a road (e.g., representing "ROAD1"). User interface 600 may also display other surrounding features, such as other roads (e.g., "ROAD2"), natural features (e.g., lakes, rivers, etc.), etc. User interface 600 may provide an indication 630 of a direction of travel of mobile user device 110, and may display an option 640 to perform a local search for points of interest near the current location of mobile user device 110.

If the user selects (e.g., via a selection mechanism, such as control buttons 330) option 640, the user may be presented with the user interface depicted in FIG. 6B. As shown in FIG. 6B, the user may be presented with a mechanism 650 (e.g., an input field, a drop-down menu (e.g. providing points of interest choices), and/or other similar input mechanisms) to input a point of interest for which to search and a mechanism 660 (e.g., an input field, a drop-down menu, and/or other similar input mechanisms) to input a direction in which to search for the point of interest. In one exemplary implementation, if the user selects "Restaurants" as a point of interest (e.g., via mechanism 650) and selects "Forward" as a direction (e.g., via mechanism 660), mobile user device 110 may provide, to server 130, a search request (e.g., local search request 540) for restaurants (e.g., near to the location of mobile user device 110) in the direction of travel of mobile user device 110.

Server 130 may receive the search request for restaurants in the direction of travel of mobile user device 110, and may determine one or more restaurants in the direction of travel of mobile user device 110. Server 130 may provide the determined one or more restaurants (e.g., local search results 550) to mobile user device 110 via a graphical user interface 600 (e.g., as depicted in FIG. 6C) and/or via a text-based user interface 600 (e.g., as depicted in FIG. 6D). As shown in FIG. 6C, user interface 600 may provide an image 670 associated with a first restaurant (e.g., "Restaurant1") and an image 680 associated with a second restaurant (e.g., "Restaurant2") that are located along direction of travel 630 of mobile user device 110. In one exemplary implementation, images 670/680 may include information associated with the restaurants, such as types of food served, menu information, logos or trademarks associated with the restaurants, distance from the restaurants (e.g., in miles), etc. As shown in FIG. 6D, user interface 600 may provide textual information 690 indicating restaurants that are located along direction of travel 630 of mobile user device 110. In one exemplary implementation, textual information 690 may include information associated with the restaurants, such as types of food served, menu information, logos or trademarks associated with the restaurants, distance from the restaurants (e.g., in miles), etc. As further shown in FIG. 6D, the number of restaurants provided by textual information 690 may be limited to a predetermined distance (e.g., one-hundred miles) along direction of travel 630 of mobile user device 110.

Although user interfaces 600 depict a variety of information, in other implementations, user interfaces 600 may depict less, additional, different, or differently arranged information than depicted in FIGS. 6A-6D.

FIG. 7 depicts a diagram of exemplary functional components of server 130. In one implementation, the functions described in connection with FIG. 7 may be performed by processing unit 220 (FIG. 2). As shown in FIG. 7, server 130 may include a directional determiner 700, a local search results generator 710, and a database 720.

Directional determiner 700 may include any hardware or combination of hardware and software that may receive GPS coordinates 520 and/or directional information 530 from mobile user device 110, and may determine direction of travel 510 of mobile user device 110 based on GPS coordinates 520 and/or directional information 530. Directional determiner 700 may determine a location 730 of mobile user device 110 based on GPS coordinates 520 and/or directional information 530. In one exemplary implementation, location 730 may include a physical location of mobile user device 110 (e.g., mobile user device 110 is located at the intersection of ROAD1 and ROAD2) as determined by GPS coordinates 520.

Local search results generator 710 may include any hardware or combination of hardware and software that may receive direction of travel 510 and location 730 from directional determiner 700, and may receive local search request 540 from mobile user device 110. Local search results generator 710 may search database 720 based on local search request 540, and may retrieve, from database 720, search results 740 that match local search request 540. Search results 740 may include one or more points of interest that match criteria set forth by local search request 540 and are in an area surrounding (e.g., within a predetermined distance from) mobile user device 110. For example, if local search request 540 includes a search for restaurants, search results 740 may include all restaurants within a predetermined radius from mobile user device 110. Local search results generator 710 may filter search results 740, based on direction of travel 510 and/or location 730, to provide local search results 550 (e.g., the determined one or more points of interest) in direction of travel 510 of mobile user device 110. Local search results generator 710 may provide local search results 550 to mobile user device 110.

Database 720 may include a storage device (e.g., main memory 230, ROM 240, storage device 250, etc.) that may store information received by server 130. In one implementation, database 720 may store information associated with one or more points of interest (e.g., that may be relevant to mobile user device 110), such as information associated with stores, restaurants, gas stations, hospitals, hotels, motels, amusement parks, historical sites, police stations, airports, train stations, etc. Database 720 may be searched based on local search request 540 and may return one or more points of interest in database 720 that match criteria (e.g., keywords, query terms, etc.) set forth by local search request 540.

Although FIG. 7 shows exemplary functional components of server 130, in other implementations, server 130 may contain fewer, different, differently arranged, or additional functional components than depicted in FIG. 7. In still other implementations, one or more functional components of server 130 may perform one or more other tasks described as being performed by one or more other functional components of server 130.

FIG. 8 illustrates a diagram of additional exemplary operations capable of being performed by an exemplary portion 800 of network 100. As illustrated, exemplary network portion 800 may include mobile user device 110, stationary user device 120, and server 130. Mobile user device 110, stationary user device 120, and server 130 may include the features described above in connection with, for example, FIG. 1.

A user associated with mobile user device 110 may access the GPS navigation application associated with mobile user device 110. The user (e.g., via mobile user device 110 and the GPS navigation application) may create user-defined path points 810, and may provide user-defined path points 810 to server 130. User-defined path points 810 may include a user-defined starting point (e.g., Philadelphia, Pa.), a user-defined destination point (e.g., New York City, N.Y.), and one or more user-defined intermediate points (e.g., waypoints, roads, locations, landmarks, points of interest, etc.) (e.g., Newark, N.J.) provided between the user-defined starting and destination points.

Server 130 may receive user-defined path points 810 (e.g., the user-defined starting, destination, and intermediate points), and may create a user-defined path 820 based on the user-defined starting point, destination point, and intermediate point(s). User-defined path 820 may include a path defined by the user-defined starting point, destination point, and intermediate point(s) (e.g., a path that starts at Philadelphia, Pa., travels through Newark, N.J., and ends at New York City, N.Y.). Server 130 may store user-defined path 820 (e.g., in a database (not shown) associated with server 130), and may retrieve information 830 associated with user-defined path 820. Information 830 may include mileage information (e.g., mileage associated with each route (e.g., road, highway, etc.) traversed on user-defined path 820), directional information (e.g., maps, road names, highway names, exit information, turn information, etc.), traffic information (e.g., traffic conditions associated with routes traversed on user-defined path 820), construction information (e.g., road construction, detour information, road closings, etc.), etc. Server 130 may retrieve information 830 from a variety of sources (e.g., from services provided by the GPS navigation application, from state and federal agencies (e.g., the department of motor vehicles), etc.).

In one exemplary implementation, server 130 may provide user-defined path 820 and/or information 830 to mobile user device 110 prior to the user beginning to traverse user-defined path 820 (e.g., with mobile user device 110). The user (e.g., via mobile user device 110) may review, edit, refine, update, etc. user-defined path 520 prior to traversing user-defined path 820. In other implementations, server 130 may provide (e.g., when requested by mobile user device 110) user-defined path 820 and/or information 830 to mobile user device 110 as the user is traversing user-defined path 820 (e.g., with mobile user device 110). In such a scenario, mobile user device 110 may provide GPS (or global navigation satellite system) coordinates 840 associated with mobile user device 110 (e.g., a location of mobile user device 110) to server 130, and server 130 may provide one or more portions of user-defined path 820 and/or information 830 that correspond to GPS coordinates 840. For example, if the user is traversing a certain street associated with user-defined path 820, server 130 may provide, to mobile user device 110, portions of user-defined path 820 and/or information 830 that correspond to the certain street.

As further shown in FIG. 8, a user-defined path may, alternatively, be defined by a device other than mobile user device 110 (e.g., by stationary user device 120) and may be provided to mobile user device 110. For example, the user associated with mobile user device 110 may access the GPS navigation application associated with mobile user device 110 and/or stationary user device 120. The user (e.g., via stationary user device 120 and the GPS navigation application) may create user-defined path points 850, and may provide user-defined path points 850 to server 130. User-defined path points 850 may include a user-defined starting point (e.g., Philadelphia, Pa.), a user-defined destination point (e.g., Washington, D.C.), and one or more user-defined intermediate points (or waypoints) (e.g., Wilmington, Del.) provided between the user-defined starting and destination points.

Server 130 may receive user-defined path points 850 (e.g., the user-defined starting, destination, and intermediate points), and may create a user-defined path 860 based on the user-defined starting point, destination point, and intermediate point(s). User-defined path 860 may include a path defined by the user-defined starting point, destination point, and intermediate point(s) (e.g., a path that starts at Philadelphia, Pa., travels through Wilmington, Del., and ends at Washington, D.C.). Server 130 may store user-defined path 860 (e.g., in a database (not shown) associated with server 130), and may retrieve information 870 associated with user-defined path 860. Information 870 may include mileage information (e.g., mileage associated with each route (e.g., road, highway, etc.) traversed on user-defined path 860), directional information (e.g., maps, road names, highway names, exit information, turn information, etc.), traffic information (e.g., traffic conditions associated with routes traversed on user-defined path 860), construction information (e.g., road construction, detour information, road closings, etc.), etc. Server 130 may retrieve information 870 from a variety of sources (e.g., from services provided by the GPS navigation application, from state and federal agencies (e.g., the department of motor vehicles), etc.).

In one exemplary implementation, server 130 may provide user-defined path 860 and/or information 870 to mobile user device 110 and/or stationary user device 120 prior to the user beginning to traverse user-defined path 860 (e.g., with mobile user device 110). The user (e.g., via mobile user device 110 and/or stationary user device 120) may review, edit, refine, update, etc. user-defined path 860 prior to traversing user-defined path 860. In other implementations, server 130 may provide (e.g., when requested by mobile user device 110) user-defined path 860 and/or information 870 to mobile user device 110 as the user is traversing user-defined path 860 (e.g., with mobile user device 110). In such a situation, mobile user device 110 may provide GPS coordinates 840 (e.g., associated with mobile user device 110) to server 130, and server 130 may provide one or more portions of user-defined path 860 and/or information 870 that correspond to GPS coordinates 840. For example, if the user is traversing a certain highway associated with user-defined path 860, server 130 may provide, to mobile user device 110, portions of user-defined path 860 and/or information 870 that correspond to the certain highway.

As also shown in FIG. 8, mobile user device 110 may be moving in a direction of travel 875 (e.g., mobile user device 110 may be traveling in a vehicle). Direction of travel 875 may include a direction (e.g., north, south, east, west, etc.) associated with the movement of mobile user device 110 (e.g., mobile user device 110 may be in a vehicle traveling southwest on southbound Interstate-95). Server 130 may receive GPS coordinates 840, and may determine direction of travel 875 based on GPS coordinates 840. For example, in one implementation, server 130 may receive GPS coordinates 840 over time (e.g., mobile user device 110 may be located at point "A" at time "0" and may be located at point "B" one minute later), and may calculate direction of travel 875 based GPS coordinates 840 (e.g., direction of travel 875 may be a direction provided by connecting point "A" to point "B").

The user, via mobile user device 110, may provide a local search request 880, for points of interest in direction of travel 875, to server 130. Local search request 880 may include a request for points of interest (e.g., restaurants, gas stations, stores, etc.) near a location of mobile user device 110 (e.g., within a certain distance, such as one-hundred miles, of mobile user device 110) and along a user-defined path (e.g., user-defined paths 820 or 860) and/or in direction of travel 875 of mobile user device 110. Server 130 may receive local search request 880, and may determine one or more points of interest, along a user-defined path (e.g., user-defined paths 820 or 860) and/or in direction of travel 875, based on local search request 880. Server 130 may provide, to mobile user device 110, local search results 890 based on local search request 880. Local search results 890 may include the determined one or more points of interest along a user-defined path (e.g., user-defined paths 820 or 860) and/or in direction of travel 875 of mobile user device 110.

In one implementation, the determined one or more points of interest along a user-defined path and/or in direction of travel 875 may include one or more points of interest within a certain distance (e.g., a certain number of miles) from mobile user device 110, within a certain distance (e.g., a certain number of miles) from the user-defined path, and/or within a certain distance (e.g., a certain number of miles) from direction of travel 875. For example, the user of mobile user device 110 may set the certain distances based on how closely the user desires the one or more points of interest to be from mobile user device 110, the user-defined paths, and/or direction of travel 875.

For example, if the user and mobile user device 110 are traveling along a highway in a southwest direction (e.g., direction of travel 875), the user (e.g., via mobile user device 110) may initiate a local search for gas stations and may have an option of requesting only search results along a user-defined path (e.g., user-defined paths 820 or 860) and/or in direction of travel 875. Server 130 may receive the local search for gas stations, may determine search results of all gas stations within a predetermined radius from mobile user device 110, and may filter the determined search results to gas stations located along the user-defined path (e.g., user-defined paths 820 or 860) and/or in direction of travel 875 of mobile user device 110. Server 130 may provide the gas stations, located along the user-defined path and/or in direction of travel 875, for display to the user (e.g., via mobile user device 110).

Although FIG. 8 shows exemplary components of network portion 800, in other implementations, network portion 800 may contain fewer, different, differently arranged, or additional components than depicted in FIG. 8. In still other implementations, one or more components of network portion 800 may perform one or more other tasks described as being performed by one or more other components of network portion 800.

FIGS. 9A-9D depict diagrams of further exemplary user interfaces 900 capable of being generated by mobile user device 110 and/or server 130. If a user (e.g., associated with mobile user device 110) accesses the GPS navigation application, the user may be presented with the user interface depicted in FIG. 9A. As shown, the user may be presented with a two-dimensional or three-dimensional view associated with a current location of mobile user device 110. For example, if GPS coordinates 840 associated with mobile user device 110 indicate that mobile user device 110 is traveling in a vehicle on a certain road (e.g., "ROAD1") and in a certain direction, user interface 900 may display an indication 905 of a direction of travel of mobile user device 110, and an image 910 of a vehicle traveling on an image of a road (e.g., representing "ROAD1"). User interface 900 may also display other surrounding features, such as other roads (e.g., "ROAD2"), natural features (e.g., lakes, rivers, etc.), etc. If the user (e.g., via mobile user device 110) selects a user-defined path (e.g., user-defined paths 820 or 860), user interface 900 may provide an indication 920 of the user-defined path (e.g., a path traveling along ROAD1 and then along ROAD2). User interface 900 may also display an option 930 to perform a local search for points of interest near the current location of mobile user device 110.

If the user selects (e.g., via a selection mechanism, such as control buttons 330) option 930, the user may be presented with the user interface depicted in FIG. 9B. As shown in FIG. 9B, the user may be presented with a mechanism 940 (e.g., an input field, a drop-down menu (e.g. providing points of interest choices), and/or other similar input mechanisms) to input a point of interest for which to search and a mechanism 950 (e.g., an input field, a drop-down menu, and/or other similar input mechanisms) to input a direction in which to search for the point of interest. In one exemplary implementation, if the user selects "Gas Stations" as a point of interest (e.g., via mechanism 940) and selects "User-defined path/forward" as a direction (e.g., via mechanism 950), mobile user device 110 may provide, to server 130, a search request (e.g., local search request 880) for gas stations (e.g., near to the location of mobile user device 110) along a user-defined path and in the direction of travel of mobile user device 110.

Figures 9C, 9D:
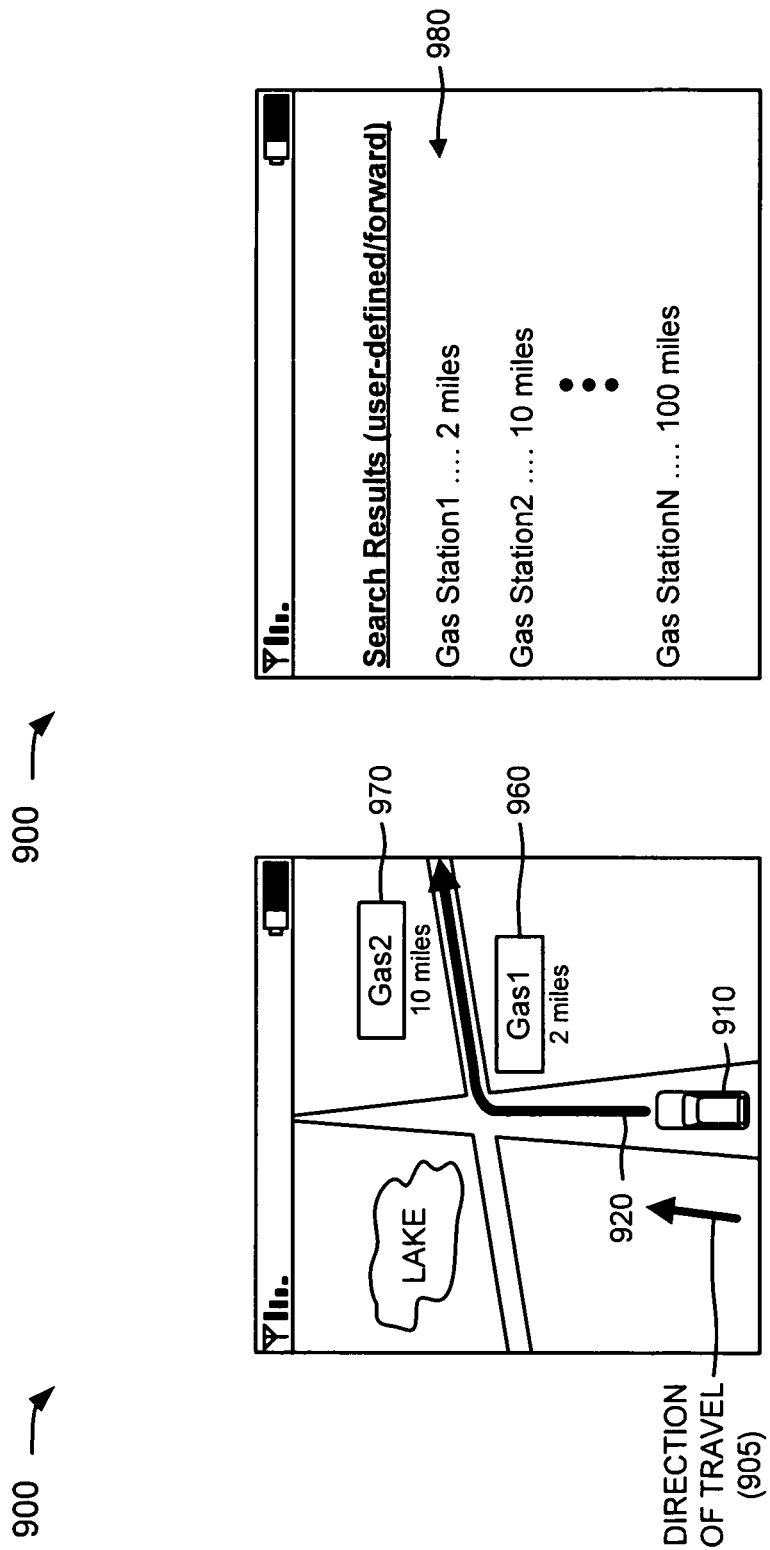

Server 130 may receive the search request for gas stations along a user-defined path and in the direction of travel of mobile user device 110, and may determine one or more gas stations along a user-defined path (e.g., user-defined path 920) and in the direction of travel (e.g., direction of travel 905) of mobile user device 110. Server 130 may provide the determined one or more gas stations (e.g., local search results 990) to mobile user device 110 via a graphical user interface 900 (e.g., as depicted in FIG. 9C) and/or via a text-based user interface 900 (e.g., as depicted in FIG. 9D). As shown in FIG. 9C, user interface 900 may provide an image 960 associated with a first gas station (e.g., "Gas1") and an image 970 associated with a second gas station (e.g., "Gas2") that are located along user-defined path 920 and/or in direction of travel 905 of mobile user device 110. In one exemplary implementation, images 960/970 may include information associated with the gas stations, such as gas prices, logos or trademarks associated with the gas stations, distance from the gas stations (e.g., in miles), etc. As shown in FIG. 9D, user interface 900 may provide textual information 980 indicating gas stations that are located along user-defined path 920 and/or in direction of travel 905 of mobile user device 110. In one exemplary implementation, textual information 980 may include information associated with the gas stations, such as gas prices, logos or trademarks associated with the gas stations, distance from the gas stations (e.g., in miles), etc. As further shown in FIG. 9D, the number of gas stations provided by textual information 980 may be limited to a predetermined distance (e.g., one-hundred miles) along user-defined path 920 and/or in direction of travel 905 of mobile user device 110.

Although user interfaces 900 depict a variety of information, in other implementations, user interfaces 900 may depict less, additional, different, or differently arranged information than depicted in FIGS. 9A-9D.

FIG. 10 illustrates a diagram of additional exemplary functional components of server 130. In one implementation, the functions described in connection with FIG. 10 may be performed by processing unit 220 (FIG. 2). As shown in FIG. 10, server 130 may include a path points receiver 1000, a database 1010, a path/information generator 1020, and a local search results generator 1030.

Path points receiver 1000 may include any hardware or combination of hardware and software that may receive user-defined path points 810 and/or GPS coordinates 840 from mobile user device 110, and/or may receive user-defined path points 850 from stationary user device 120. Path points receiver 1000 may provide user-defined path points 810 and/or user-defined path points 850 to database 1010 and/or to path/information generator 1020.

Database 1010 may include a storage device (e.g., main memory 230, ROM 240, storage device 250, etc.) that may store information received by server 130. In one implementation, database 1010 may store user-defined path points 810 and/or GPS coordinates 840 received from mobile user device 110. In other implementations, database 1010 may store user-defined path points 850 received from stationary user device 120. In still other implementation, database 1010 may store user-defined path 820, information 830 associated with user-defined path 820, user-defined path 860, and/or information 870 associated with user-defined path 860 (e.g., received from path/information generator 1020). Database 1010 may store information associated with one or more points of interest (e.g., that may be relevant to mobile user device 110), such as information associated with stores, restaurants, gas stations, hospitals, hotels, motels, amusement parks, historical sites, police stations, airports, train stations, etc. Database 1010 may be searched based on local search request 880 and may return one or more points of interest in database 1010 that match criteria (e.g., keywords, query terms, etc.) set forth by local search request 880.

Path/information generator 1020 may include any hardware or combination of hardware and software that may receive user-defined path points 810 and/or user-defined path points 850 from path points receiver 1000, may create user-defined path 820 based on user-defined path points 810, and may create user-defined path 860 based on user-defined path points 850. Path/information generator 1020 may also receive path information 1040 from a variety of sources (e.g., from services provided by the GPS navigation application, from state and federal agencies, etc.). Path information 1040 may include may include mileage information, directional information (e.g., maps, road names, highway names, exit information, turn information, etc.), traffic information, construction information (e.g., road construction, detour information, road closings, etc.), etc. Path/information generator 1020 may associate corresponding path information 1040 with user-defined path 820 and/or user-defined path 860 to create information 830 associated with user-defined path 820 and information 870 associated with user-defined path 860, respectively. As further shown in FIG. 10, path/information generator 1020 may provide user-defined path 820, information 830, user-defined path 860, and/or information 870 to database 1010. Path/information generator 1020 may provide user-defined path 820 and information 830 to mobile user device 110, and may provide user-defined path 860 and information 870 to mobile user device 110 and/or stationary user device 120.

Local search results generator 1030 may include any hardware or combination of hardware and software that may receive GPS coordinates 840 from mobile user device 110 and may determine direction of travel 875 of mobile user device 110 based on GPS coordinates 840. Local search results generator 1030 may receive user-defined path 820, information 830, user-defined path 860, and/or information 870 from path/information generator 1020, and may receive local search request 880 from mobile user device 110. Local search results generator 1030 may search database 1010 based on local search request 880, and may retrieve, from database 1010, search results 1050 that match local search request 880. Search results 1050 may include one or more points of interest that match criteria set forth by local search request 880 and are in an area surrounding (e.g., within a predetermined distance from) mobile user device 110. For example, if local search request 880 includes a search for gas stations, search results 1050 may include all gas stations within a predetermined radius from mobile user device 110. Local search results generator 1030 may filter search results 1050, based on direction of travel 875 and/or user-defined paths 820 or 860, to provide local search results 890 (e.g., the determined one or more points of interest) along a user-defined path (e.g., user-defined paths 820 or 860) and/or in direction of travel 875 of mobile user device 110. Local search results generator 1030 may provide local search results 890 to mobile user device 110.

Although FIG. 10 shows exemplary functional components of server 130, in other implementations, server 130 may contain fewer, different, differently arranged, or additional functional components than depicted in FIG. 10. For example, server 130 may include directional determiner 700, as described above in connection with FIG. 7. In still other implementations, one or more functional components of server 130 may perform one or more other tasks described as being performed by one or more other functional components of server 130.

Figure 12:
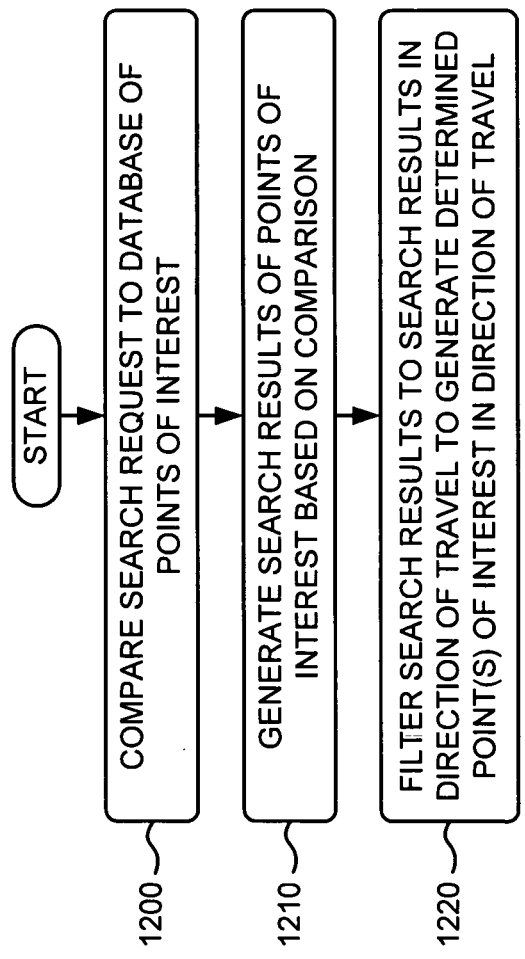

FIGS. 11 and 12 depict flow charts of an exemplary process 1100 for determining points of interest in a direction of travel of a mobile user device according to implementations described herein. In one implementation, process 1100 may be performed by server 130. In another implementation, some or all of process 1100 may be performed by another device or group of devices, including or excluding server 130.

As illustrated in FIG. 11, process 1100 may begin with receipt of GPS coordinates associated with a mobile user device (block 1110), and determination of a direction of travel of the mobile user device based on the GPS coordinates (block 1120). For example, in implementations described above in connection with FIG. 5, mobile user device 110 may be moving in direction of travel 510 (e.g., mobile user device 110 may be traveling in a vehicle), and may provide GPS coordinates 520 and/or directional information 530, associated mobile user device 110, to server 130. Direction of travel 510 may include a direction (e.g., north, south, east, west, etc.) associated with the movement of mobile user device 110 (e.g., mobile user device 110 may be in a vehicle traveling northeast on northbound Interstate-95). GPS coordinates 520 may provide a location of mobile user device 110. Directional information 530 may include information associated with direction of travel 510 and may be determined based on GPS coordinates 520 associated with mobile user device 110 over time. Server 130 may receive GPS coordinates 520 and/or directional information 530, and may determine direction of travel 510 based on GPS coordinates 520 and/or directional information 530.

As further shown in FIG. 11, a search request for points of interest in the direction of travel may be received from the mobile user device (block 1130), one or more points of interest in the direction of travel may be determined based on the search request (block 1140), and the determined one or more points of interest in the direction of travel may be provided to the mobile user device (block 1150). For example, in implementations described above in connection with FIG. 5, the user, via mobile user device 110, may provide local search request 540, for points of interest in direction of travel 510, to server 130. Local search request 540 may include a request for points of interest (e.g., restaurants, gas stations, stores, etc.) near a location of mobile user device 110 (e.g., within a certain distance, such as one-hundred miles, of mobile user device 110) and in direction of travel 510 of mobile user device 110. Server 130 may receive local search request 540 for points of interest in direction of travel 510, and may determine one or more points of interest in direction of travel 510 based on local search request 540. Server 130 may provide, to mobile user device 110, local search results 550 based on local search request 540. Local search results 550 may include the determined one or more points of interest in direction of travel 510 of mobile user device 110.

Process block 1140 may include the process blocks depicted in FIG. 12. As shown in FIG. 12, process block 1140 may include comparing the search request to a database of points of interest (block 1200), generating search results of points of interest based on the comparison (block 1210), and filtering the search results to search results in the direction of travel to generate the determined one or more points of interest in the direction of travel (block 1220). For example, in implementations described above in connection with FIG. 7, local search results generator 710 of server may search database 720 based on local search request 540, and may retrieve, from database 720, search results 740 that match local search request 540. Search results 740 may include one or more points of interest that match criteria set forth by local search request 540 and are in an area surrounding (e.g., within a predetermined distance from) mobile user device 110. In one example, if local search request 540 includes a search for restaurants, search results 740 may include all restaurants within a predetermined radius from mobile user device 110. Local search results generator 710 may filter search results 740, based on direction of travel 510 and/or location 730, to provide local search results 550 (e.g., the determined one or more points of interest) in direction of travel 510 of mobile user device 110.

FIGS. 13 and 14 depict flow charts of an exemplary process 1300 for determining points of interest, in a direction of travel and along a user-defined path, of a mobile user device according to implementations described herein. In one implementation, process 1300 may be performed by server 130. In another implementation, some or all of process 1300 may be performed by another device or group of devices, including or excluding server 130.

As illustrated in FIG. 13, process 1300 may begin with receipt of user-defined starting, destination, and intermediate points of a path (block 1310) and creation of a user-defined path based on the starting, destination, and intermediate points (block 1320). For example, in implementations described above in connection with FIG. 8, server 130 may receive user-defined path points 810 (e.g., the user-defined starting, destination, and intermediate points), and may create user-defined path 820 based on the user-defined starting point, destination point, and intermediate point(s). User-defined path 820 may include a path defined by the user-defined starting point, destination point, and intermediate point(s) (e.g., a path that starts at Philadelphia, Pa., travels through Newark, N.J., and ends at New York City, N.Y.). Server 130 may store user-defined path 820 (e.g., in a database (not shown) associated with server 130), and may retrieve information 830 associated with user-defined path 820. Information 830 may include mileage information (e.g., mileage associated with each route (e.g., road, highway, etc.) traversed on user-defined path 820), directional information (e.g., maps, road names, highway names, exit information, turn information, etc.), traffic information (e.g., traffic conditions associated with routes traversed on user-defined path 820), construction information (e.g., road construction, detour information, road closings, etc.), etc.

As further shown in FIG. 13, GPS coordinates, associated with a mobile user device traversing the user-defined path, may be received (block 1330) and a direction of travel of the mobile user device may be determined based on the GPS coordinates (block 1340). For example, in implementations described above in connection with FIG. 8, mobile user device 110 may be moving in direction of travel 875 (e.g., mobile user device 110 may be traveling in a vehicle). Direction of travel 875 may include a direction (e.g., north, south, east, west, etc.) associated with the movement of mobile user device 110 (e.g., mobile user device 110 may be in a vehicle traveling southwest on southbound Interstate-95). Server 130 may receive GPS coordinates 840, and may determine direction of travel 875 based on GPS coordinates 840. In one example, server 130 may receive GPS coordinates 840 over time (e.g., mobile user device 110 may be located at point "A" at time "0" and may be located at point "B" one minute later), and may calculate direction of travel 875 based GPS coordinates 840 (e.g., direction of travel 875 may be a direction provided by connecting point "A" to point "B").

As further shown in FIG. 13, a search request, for points of interest in the direction of travel and/or along the user-defined path, may be received from the mobile user device (block 1350), one or more points of interest in the direction of travel and/or along the user-defined path may be determined based on the search request (block 1360), and the determined one or more points of interest in the direction of travel and/or along the user-defined path may be provided to the mobile user device (block 1370). For example, in implementations described above in connection with FIG. 8, the user, via mobile user device 110, may provide local search request 880, for points of interest in direction of travel 875, to server 130. Local search request 880 may include a request for points of interest (e.g., restaurants, gas stations, stores, etc.) near a location of mobile user device 110 (e.g., within a certain distance, such as one-hundred miles, of mobile user device 110) and along a user-defined path (e.g., user-defined paths 820 or 860) and/or in direction of travel 875 of mobile user device 110. Server 130 may receive local search request 880, and may determine one or more points of interest, along a user-defined path (e.g., user-defined paths 820 or 860) and/or in direction of travel 875, based on local search request 880. Server 130 may provide, to mobile user device 110, local search results 890 based on local search request 880. Local search results 890 may include the determined one or more points of interest along a user-defined path (e.g., user-defined paths 820 or 860) and/or in direction of travel 875 of mobile user device 110.

Process block 1360 may include the process blocks depicted in FIG. 14. As shown in FIG. 14, process block 1360 may include comparing the search request to a database of points of interest (block 1400), generating search results of points of interest based on the comparison (block 1410), and filtering the search results, to search results in the direction of travel and/or along the user-defined path, to generate the determined one or more points of interest in the direction of travel and/or along the user-defined path (block 1420). For example, in implementations described above in connection with FIG. 10, local search results generator 1030 of server 130 may search database 1010 based on local search request 880, and may retrieve, from database 1010, search results 1050 that match local search request 880. Search results 1050 may include one or more points of interest that match criteria set forth by local search request 880 and are in an area surrounding (e.g., within a predetermined distance from) mobile user device 110. In one example, if local search request 880 includes a search for gas stations, search results 1050 may include all gas stations within a predetermined radius from mobile user device 110. Local search results generator 1030 may filter search results 1050, based on direction of travel 875 and/or user-defined paths 820 or 860, to provide local search results 890 (e.g., the determined one or more points of interest) along a user-defined path (e.g., user-defined paths 820 or 860) and/or in direction of travel 875 of mobile user device 110.

Systems and/or methods described herein may enable a user to filter points of interest search results provided by a navigation application associated with a mobile user device (e.g., a cell phone, a PDA, a GPS navigation device, etc.) to points of interest in a direction of travel of the mobile user device and/or along a user-defined path. In one implementation, for example, the systems and/or methods may receive GPS coordinates associated with a mobile user device, and may determine a direction of travel of the mobile user device based on the GPS coordinates. The systems and/or methods may receive, from the mobile user device, a search request for points of interest in the direction of travel, and may determine, based on the search request, one or more points of interest in the direction of travel. The systems and/or methods may provide, to the mobile user device, the determined one or more points of interest in the direction of travel.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 11-14, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a computing device, global positioning system (GPS) coordinates associated with a mobile device;
    determining, by the computing device, a direction of travel of the mobile device based on the GPS coordinates;
    providing, by the computing device and to the mobile device, a drop-down menu to be used to input a direction in which to search for one or more points of interest;
    receiving, by the computing device and from the mobile device, information identifying a selection of a forward direction, for the direction, from the drop-down menu,
        the information identifying the selection of the forward direction including a search request for the one or more points of interest,
        the search request including a request for the one or more points of interest to be within a first distance from the mobile device in the forward direction of the direction of travel and for the one or more points of interest to be within a second distance from the mobile device that is a radius from the forward direction of the direction of travel, and
        the first distance being different from the second distance;
    comparing, by the computing device, the search request to a database of points of interest;
    generating, by the computing device, search results associated with points of interest based on the comparing;
    filtering, by the computing device, the search results to one or more search results associated with the one or more points of interest that are within the first distance from the mobile device in the forward direction of the direction of travel and within the second distance from the mobile device that is the radius from the forward direction of the direction of travel; and
    providing, to the mobile device and based on the one or more search results, information regarding the one or more points of interest.

2. The method of claim 1,
    where receiving the GPS coordinates associated with the mobile device comprises:

receiving, at a first time, first GPS coordinates of the GPS coordinates associated with the mobile device, and receiving, at a second time, second GPS coordinates of the GPS coordinates associated with the mobile device, the second time being different from the first time, and where determining the direction of travel of the mobile device comprises:

determining the direction of travel of the mobile device based on the first GPS coordinates and the second GPS coordinates.

3. The method of claim 1, where the search request comprises a search associated with one or more of:
stores,
restaurants,
gas stations,
hospitals,
hotels,
motels,
amusement parks,
historical sites,
police stations,
airports, or
train stations.

4. The method of claim 1, where the mobile device comprises one or more of:
a radiotelephone,
a personal communications system (PCS) terminal,
a personal digital assistant (PDA),
a laptop computer,
a global positioning system (GPS) navigation device, or
an in-vehicle GPS navigation system.

5. A method comprising:
receiving, by a computing device and via a global positioning system (GPS) navigation application of a mobile device,
a user-defined starting point associated with a path to be navigated by a user associated with the mobile device,
a user-defined destination point associated with the path, and
one or more user-defined intermediate points provided between the user-defined starting point and the user-defined destination point;
creating, by the computing device, a user-defined path based on the user-defined starting point, the user-defined destination point, and the one or more user-defined intermediate points;
providing the user-defined path to the mobile device;
providing, to the mobile device, a user interface that includes a drop-down menu used to input a direction in which to search the one or more points of interest;
receiving, from the mobile device, information identifying a selection of a forward direction, for the direction, from the drop-down menu,
the information identifying the selection of the forward direction including a search request for the one or more points of interest,
the search request including a request for the one or more points of interest to be within a first distance from the mobile device in the forward direction and for the one or more points of interest to be within a second distance from the mobile device that is a radius from the user-defined path, and
the first distance being different from the second distance;

comparing, by the computing device, the search request to a data structure of points of interest;
generating, by the computing device, search results associated with points of interest based on the comparing;
filtering, by the computing device, the search results to one or more search results associated with the one or more points of interest that are within the first distance from the mobile device in the forward direction and within the second distance from the mobile device that is the radius from the user-defined path; and
providing, to the mobile device and based on the one or more search results, information regarding the one or more points of interest.

6. The method of claim 5, further comprising:
receiving GPS coordinates associated with the mobile device traversing the user-defined path; and
determining a direction of travel of the mobile device based on the GPS coordinates, and
the one or more points of interest being in the forward direction of the direction of travel.

7. The method of claim 6,
where receiving the GPS coordinates associated with the mobile device comprises:
receiving, at a first time, first GPS coordinates of the GPS coordinates associated with the mobile device, and
receiving, at a second time, second GPS coordinates of the GPS coordinates associated with the mobile device,
the second time being different from the first time, and
where determining the direction of travel of the mobile device comprises:
determining the direction of travel of the mobile device based on the first GPS coordinates and the second GPS coordinates.

8. The method of claim 5, where the search request comprises a search associated with one or more of:
stores,
restaurants,
gas stations,
hospitals,
hotels,
motels,
amusement parks,
historical sites,
police stations,
airports, or
train stations.

9. The method of claim 5, where the mobile device comprises one or more of:
a radiotelephone,
a personal communications system (PCS) terminal,
a personal digital assistant (PDA),
a laptop computer,
a global positioning system (GPS) navigation device, or
an in-vehicle GPS navigation system.

10. The method of claim 5, further comprising:
receiving information associated with the user-defined path; and
providing, to the mobile device, the information associated with the user-defined path.

11. The method of claim 10, where receiving the information associated with the user-defined path comprises one or more of:
receiving mileage information associated with the user-defined path, receiving directional information associated with the user-defined path, receiving traffic information associated with the user-defined path, or receiving construction information associated with the user-defined path.

12. The method of claim 5, where providing the user-defined path comprises:

providing the user-defined path to the mobile device when the user is navigating the user-defined path.

13. A device comprising:

a processor to:

receive a user-defined starting point associated with a path to be navigated by a user associated with a mobile device, receive a user-defined destination point associated with the path, create a user-defined path based on the user-defined starting point and the user-defined destination point, provide the user-defined path to the mobile device, receive global positioning system (GPS) coordinates associated with the mobile device traversing the user-defined path, provide, to the mobile device, a mechanism to be used to input a direction in which to search for one or more points of interest;

receive, from the mobile device, information identifying a selection of a forward direction, as the direction, from the mechanism, the information identifying the selection of the forward direction including a search request for the one or more points of interest, the search request including a request for the one or more points of interest to be within a first distance from the mobile device in the forward direction and within a second distance from the mobile device that is a radius from the user-defined path, and the first distance being different from the second distance, compare the search request and the GPS coordinates to a data structure of points of interest, generate search results associated with points of interest based on the comparing, filter the search results to one or more search results associated with the one or more points of interest that are within the first distance from the mobile device in the forward direction and within the second distance from the mobile device that is the radius from the user-defined path, and provide, to the mobile device, and based on the one or more search results information regarding the one or more points of interest.

14. The device of claim 13, where the processor is further to:

determine a direction of travel of the mobile device based on the GPS coordinates, the one or more points of interest being in the forward direction of the direction of travel.

15. The device of claim 14, where, when receiving the GPS coordinates associated with the mobile device, the processor is to:

receive, at a first time, first GPS coordinates of the GPS coordinates associated with the mobile device, and receive, at a second time, second GPS coordinates of the GPS coordinates associated with the mobile device, the second time being different from the first time, and where, when determining the direction of travel of the mobile device, the processor is to:

determine the direction of travel of the mobile device based on the first GPS coordinates and the second GPS coordinates.

16. The device of claim 13, where the search request comprises a search associated with one or more of:

stores,
restaurants,
gas stations,
hospitals,
hotels,
motels,
amusement parks,
historical sites,
police stations,
airports, or
train stations.

17. The device of claim 13, where the processor is further to:

receive information associated with the user-defined path, and provide, to the mobile device, the information associated with the user-defined path.

18. The device of claim 17, where the information associated with the user-defined path comprises one or more of:

mileage information associated with the user-defined path, directional information associated with the user-defined path, traffic information associated with the user-defined path, or construction information associated with the user-defined path.

19. The device of claim 13, where, when providing the user-defined path, the processor is to:

provide the user-defined path to the mobile device when the user is navigating the user-defined path.

20. A method comprising:

providing, by a mobile device and for display in a global positioning system (GPS) navigation application, an option to perform a search for one or more points of interest;

identifying, by the mobile device, a selection of the option to perform the search for the one or more points of interest;

providing, by the mobile device and for display, a drop-down menu to input a direction in which to search for the one or more points of interest based on the selection of the option to perform the search for the one or more points of interest;

receiving, by the mobile device, information identifying a selection of a forward direction, for the direction, from the drop-down menu;

providing, by the mobile device, a search request for the one or more points of interest based on the selection of the forward direction, the search request including a request for the one or more points of interest to be within a first distance from the mobile device in the forward direction of a user-defined path or a direction of travel of the mobile device and within a second distance from the mobile device that is a radius from the user-defined path or from the direction of travel of the mobile device, the search request being compared to a database of points of interest to generate search results associated with points of interest, and the search results associated with points of interest being filtered to one or more search results associated with the one or more points of interest;
receiving, by the computing device, the one or more search results; and
providing, by the mobile device and for display, information regarding the one or more points of interest based on the one or more search results.

21. The method of claim 20, further comprising:
receiving a starting point defined by a user of the mobile device;
receiving an ending point defined by the user;
determining the user-defined path based on the starting point and the ending point; and
providing, for display, an indication of the user-defined path,
the forward direction being a forward direction of the user-defined path.

22. The method of claim 20, further comprising:
receiving information identifying a type of the one or more points of interest,
the search request including the information identifying the type of the one or more points of interest.

23. The method of claim 20, further comprising:
receiving, for display, information identifying a selection an option requesting for the one or more points of interest to be along only the user-defined path,
the search request including the request for the one or more points of interest to be within the first distance from the mobile device in the forward direction of the user-defined path and for the one or more points of interest to be within the second distance from the mobile device that is the radius from the direction of travel.

24. The method of claim 20, further comprising:
receiving, for display, information identifying a selection an option requesting for the one or more points of interest to be along only the direction of travel,
the search request including the request for the one or more points of interest to be within the first distance from the mobile device in the forward direction of the direction of travel and for the one or more points of interest to be within the second distance from the mobile device that is the radius from the direction of travel.

25. The method of claim 20, where providing the information regarding the one or more points of interest comprises:
providing, for display, first information identifying a point of interest of the one or more points of interest, and
providing, for display, second information identifying a distance from the mobile device to the point of interest along the user-defined path or in the direction of travel.

* * * * *